Patented Oct. 8, 1940

2,217,282

UNITED STATES PATENT OFFICE 2,217,282

SMOKING MEAT

Harry F. Lewis, Appleton, Wis., assignor, by mesne assignments, to The Pacific Lumber Company, San Francisco, Calif., a corporation of Maine No Drawing. Application September 2, 1939, Serial No. 293,229

5 Claims. (Cl. 99—229)

The present invention relates to an improvement in the smoking of meat and the like.

Heretofore it has been the practice to smoke meat, e. g., pork, with smoke from woods such as maple, hickory, and the like. Although such treatments have been found in certain cases to improve the flavor of meat, they have not been found for the most part satisfactory. The art has long recognized the need for an improved smoking treatment that would give meat characteristics of the type desired.

I have discovered that redwood smoke is adaptable for smoking meat, e. g. pork (including ham and bacon), beef, poultry, fish, etc. I have also discovered that redwood smoke produces less color formation, i. e. less discoloration, while at the same time greater flavor production. I have further discovered that redwood smoked meat molds at a slower rate than other types of smoked meat.

The redwood preferred for use in the present invention is the *Sequoia sempervirens*. In practice, I have found it to advantage to use redwood chips, sawdust, or the like, for the smoking treatment,—which may be carried out in the ordinary smokehouse with a smoldering fire in accordance with general practice.

Extensive investigations have shown redwood smoke to be unique in that it imparts to meat characteristics including flavor, reduced mold growth, etc. of the type desired. Animal fat, for example bacon fat, smoked with redwood possesses an agreeable, natural meaty flavor as distinguished from the "lardy" taste found in most bacon available heretofore. Although the present invention is not limited by theoretical explanations, my investigations indicate that the improvements obtained by the redwood smoke treatment are due, in part, to the complex resinous material found in redwood.

In the specification and claims it will be understood that the term "meat" include fish as well as the ordinary meats, such as pork, beef, etc. All modifications coming within the spirit and scope of the present invention are intended to be covered by the claims annexed hereto.

I claim:

1. In the art of smoking meat, the improvement which includes the use of redwood smoke.

2. In the art of smoking pork, the improvement which consists in using smoke obtained from redwood known as *Sequoia sempervirens*.

3. In the art of smoking ham and bacon, the improvement which consists in obtaining the smoke by burning redwood sawdust.

4. In the art of smoking poultry, the improvement which consists in using redwood smoke.

5. In the art of smoking fish, the improvement which consists in using redwood smoke.

HARRY F. LEWIS.